United States Patent
Bhatt et al.

(10) Patent No.: US 11,689,615 B2
(45) Date of Patent: Jun. 27, 2023

(54) AIRLINE PEER-TO-PEER DATA TRANSFER SYSTEM

(71) Applicant: UNITED AIRLINES, INC., Chicago, IL (US)

(72) Inventors: Divyang Bhatt, Cary, NC (US); Prasanta Dhala, Aurora, IL (US); Barun Nandi, Naperville, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 34 days.

(21) Appl. No.: 17/536,838

(22) Filed: Nov. 29, 2021

(65) Prior Publication Data

US 2023/0171309 A1  Jun. 1, 2023

(51) Int. Cl.
*G06F 15/16* (2006.01)
*H04L 67/104* (2022.01)
*H04L 67/12* (2022.01)
*H04W 4/80* (2018.01)

(52) U.S. Cl.
CPC ............ *H04L 67/104* (2013.01); *H04L 67/12* (2013.01); *H04W 4/80* (2018.02)

(58) Field of Classification Search
CPC ......... H04L 67/104; H04L 67/12; H04W 4/80
See application file for complete search history.

(56) References Cited

U.S. PATENT DOCUMENTS

| | | |
|---|---|---|
| 10,931,753 B1 | 2/2021 | Karpiniec et al. |
| 2010/0064327 A1* | 3/2010 | Lynch ................... G06F 16/182 |
| | | 725/76 |
| 2014/0242910 A1* | 8/2014 | Umlauft ................ H04L 63/107 |
| | | 455/41.1 |
| 2015/0058929 A1* | 2/2015 | Ayyagari .............. H04L 63/102 |
| | | 726/3 |
| 2017/0070841 A1 | 3/2017 | Shalunov et al. |

(Continued)

OTHER PUBLICATIONS

Hudson; "How to create a peer-to-peer network using the miltipeer connectivity framewor;" Hacking With Swift, May 28, 2019.

(Continued)

*Primary Examiner* — Normin Abedin
(74) *Attorney, Agent, or Firm* — Marshall, Gerstein & Borun LLP

(57) ABSTRACT

A method and system may provide offline communications on an aircraft by establishing a mesh network for client devices of airline personnel to communicate peer-to-peer. A first client device executing an airline application on an aircraft determines that the first client device is unable to access an online airline database. The first client device provides, via a short-range communication protocol over a dedicated secure communication channel, a request to open a communication session with a second client device. The request includes identification information for the first client device and an indication of the airline application executing on the first client device. In response to the second client device determining that the first client device has permission to communicate airline data peer-to-peer with the second client device in a mesh network, the first client device receives airline data via the mesh network, and stores a local copy of the airline data.

20 Claims, 9 Drawing Sheets

(56) References Cited

U.S. PATENT DOCUMENTS

2017/0310543 A1* 10/2017 Greig ................. H04B 7/18506
2019/0245916 A1    8/2019 Abalyaev et al.

OTHER PUBLICATIONS

Chandran et al., Convergence communication over heterogeneous mesh network for disaster and underserved areas, 2020 IEEE 17th Annual Consumer Communications & Networking Conference, 4 pp (Jan. 2020).
European Patent Application No. 22209165.4, Extended European Search Report, dated Mar. 22, 2023.

* cited by examiner

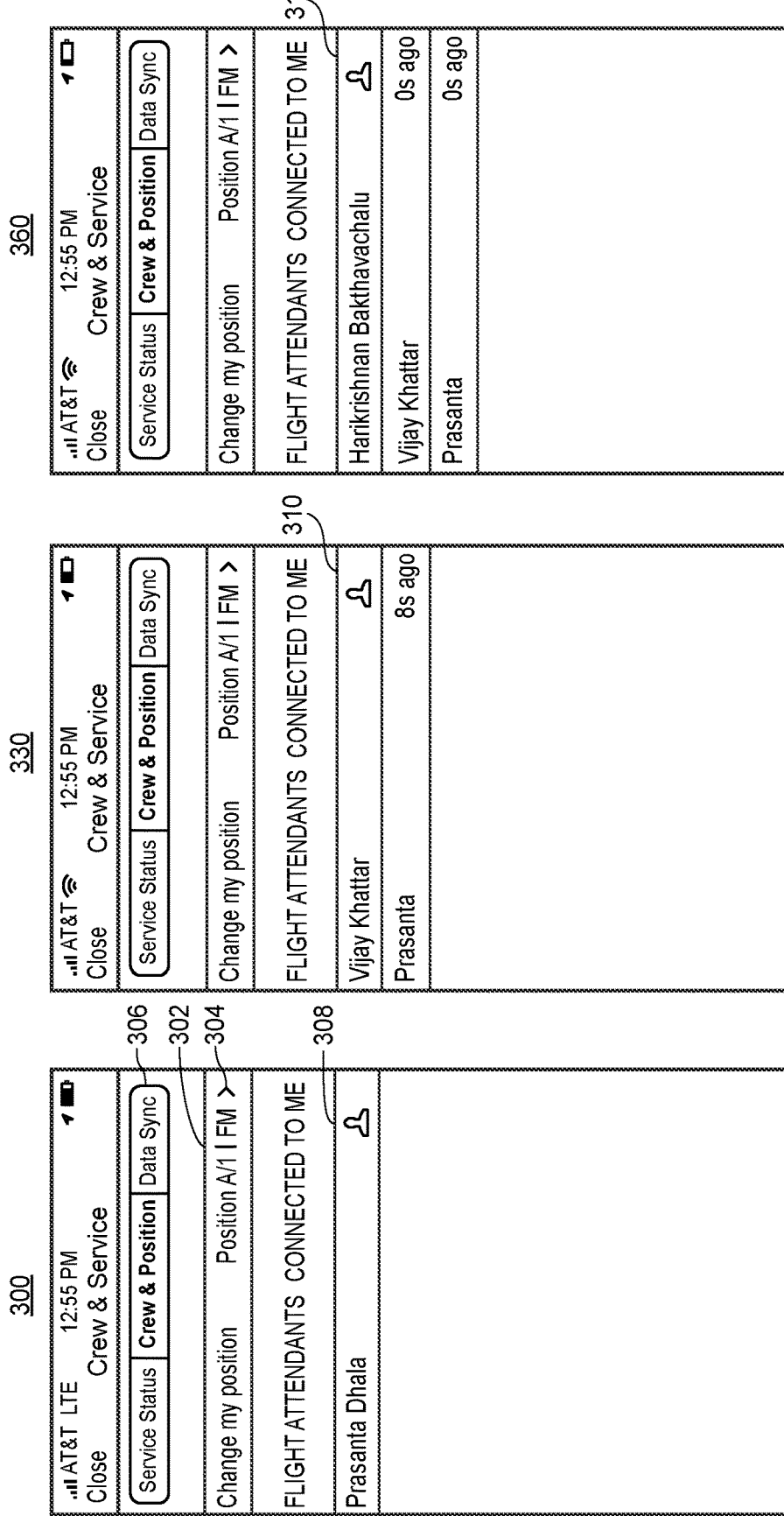

AIRLINE PEER-TO-PEER DATA TRANSFER SYSTEM

TECHNICAL FIELD

The present disclosure generally relates to peer-to-peer data transfer on an aircraft, and more particularly to establishing a mesh network for allowing data transfer for devices on an aircraft that are unable to connect to the Internet.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many devices on an aircraft are unable to connect to a cellular network or the Internet through a Wi-Fi service, for example during the flight. However, important information for the flight crew is typically stored at an online database, such as passenger seat information, meal inventories, passenger meal requests, the locations of flight crew members, etc. Additionally, this information may change throughout the flight.

For example, passengers change seats or may request different meals. Accordingly, flight crew members have to manually write down meal orders, where each passenger is seated, and have to go back and forth to the galley to retrieve meals and make sure each passenger's order is available. Flight crew members may operate independently of each other which can create the possibility for miscommunication, confusion, and inaccuracies such as passengers receiving the incorrect meals.

BRIEF SUMMARY

To provide offline communications on an aircraft, for example during a flight, client devices such as those of flight crew members communicate peer-to-peer to establish a mesh network between the client devices. Each client device stores a local copy of airline data and shares any updates to the airline data with each other to synchronize the devices. To join the mesh network and communicate with the other devices, a client device must meet a specific set of security requirements. For example, when a first client device receives a request from a second client device to join the mesh network, the second client device may determine whether the request is received over a dedicated secure communication channel. The second client device may also receive identification information for the first client device with the request and an indication of the application on the first client device initiating the request. The second client device may compare the identification information for the first client device to a list of client devices approved to join the mesh network, such as a list of client devices associated with flight crew members. The second client device may also determine whether the application initiating the request is a particular airline application having permission to communicate over the mesh network. If the second client device determines the first client device initiated the request over a predetermined dedicated secure communication channel, is on the list of client devices approved to join the mesh network, and/or is executing the particular airline application having permission to communicate over the mesh network, the second client device may allow the first client device to enter the mesh network.

Client devices in the mesh network may communicate directly with each other over a short-range communication protocol, such as Bluetooth®, Bluetooth Low Energy (BLE), and/or Wi-Fi Direct. Additionally, when one client device is outside a threshold communication range of another in the mesh network, a third client device may act as a bridge to communicate airline data between the two. For example, if a first flight crew member is in the front of the aircraft, a second flight crew member is near the back of the aircraft, and the second flight crew member updates the airline data and transmits the updated airline data to the other client devices via the mesh network, a third flight crew member's client device may receive the updated airline data and retransmit it to the first flight crew member's client device so that the first flight crew member may receive the updated airline data even if they are outside of the threshold communication range of the second flight crew member's client device.

Furthermore, the client devices may initially obtain online data from online airline databases when they are on the ground for example. In this manner, the client devices may obtain a seat map for the flight, indications of where each passenger is located, their meal requests if they made them before the flight, meal inventory information, etc. Then once the aircraft begins traveling to the destination and the client devices are unable to connect to the Internet, the client devices communicate updates to the airline data to each other.

For example, when flight crew members change positions within the aircraft, they may indicate their changed position via the airline application executing on their client device and store a local copy of the updated airline data including the changed position at their client device. Then the client device may transmit the updated airline data to the other client devices in the mesh network so that each of the flight crew members are aware of the new location of the flight crew member. Furthermore, a flight crew member may record an updated meal inventory after reviewing the meals that are available in the galley, such as the total number of meals available, the number of available meals for a first type of meal, a second type of meal, etc. Then the client device may transmit the updated airline data to the other client devices in the mesh network so that each of the flight crew members are aware of the current meal inventory on the aircraft. Still further, a flight crew member may record meal orders for passengers at particular seats and may transmit the updated airline data to the other client devices in the mesh network so that each of the flight crew members are aware of the passengers' meal orders on the aircraft. The airline application for each client device may then display a seat map for the aircraft indicating the type of meal requested at each respective seat. When a flight crew member drops off a meal at a particular seat, the flight crew member may indicate that the meal has been dropped off at the particular seat and may transmit the updated airline data to the other client devices in the mesh network so that each of the flight crew members are aware of which passengers have received their meals and which haven't.

In this manner, the flight crew members can communicate with each other in an efficient manner even when their client devices cannot connect to an online airline database via the Internet. This allows the flight crew members to work together in an organized fashion so that each flight crew member is aware of the activity by passengers and/or the other flight crew members in real-time or at least near real-time, thereby reducing inaccuracies when fulfilling passenger requests. This also allows the flight crew members to have more complete information to explain to a passenger, for example why their first meal request is unavailable. Furthermore, the present embodiments advantageously ensure that only authorized devices can communicate over the mesh network to improve the security of the system. Each client device has to meet several security requirements (e.g., the client device initiated the request over a predetermined dedicated secure communication channel, is on the list of client devices approved to join the mesh network, and/or is executing the particular airline application having permission to communicate over the mesh network) to join the mesh network. In this manner, unauthorized devices are unable to join the network and compromise the security of the system. Even if an unauthorized client device were able to access the mesh network, the airline data is encrypted to prevent an unauthorized client device from reading the airline data.

In an embodiment, a method for providing offline communications on an aircraft is provided. The method includes determining, by a first client device executing an airline application on an aircraft while the aircraft is in flight, that the first client device is unable to access an online airline database. The method further includes providing, via a short-range communication protocol over a dedicated secure communication channel, a request to a second client device to open a communication session with the second client device. The request includes identification information for the first client device and an indication of the airline application executing on the first client device. In response to the second client device determining that the first client device has permission to communicate airline data peer-to-peer with the second client device in a mesh network, the method includes receiving airline data via the mesh network to synchronize the first client device with the airline data stored at the second client device, and storing a local copy of the airline data at the first client device.

In another embodiment, another method for providing offline communications on an aircraft is provided. The method includes determining, by a first client device executing an airline application on an aircraft while the aircraft is in flight, that the first client device is unable to access an online airline database. The method further includes receiving, via a short-range communication protocol over a dedicated secure communication channel, a request from a second client device to open a communication session with the first client device. The request includes identification information for the second client device and an indication of the airline application executing on the second client device. Additionally, the method includes determining whether the second client device has permission to access a mesh network for communicating airline data peer-to-peer based on one or more of: (i) the dedicated secure communication channel over which the request is received, (ii) the identification information for the second client device, or (iii) the indication of the airline application executing on the second client device. In response to determining that the second client device has permission to access the mesh network, the method includes providing airline data to the second client device via the mesh network to synchronize the second client device with the airline data stored at the first client device.

In yet another embodiment, a first client device for providing offline communications on an aircraft is provided. The first client device includes a local database storing airline data, one or more processors, and a non-transitory computer readable memory coupled to the one or more processors and the database, including an airline application stored thereon. When executed by the one or more processors, the airline application causes the first client device to determine on an aircraft while the aircraft is in flight that the first client device is unable to access an online airline database, and receive, via a short-range communication protocol over a dedicated secure communication channel, a request from a second client device to open a communication session with the first client device. The request includes identification information for the second client device and an indication of the airline application executing on the second client device. The airline application further causes the first client device to determine whether the second client device has permission to access a mesh network for communicating the airline data peer-to-peer based on one or more of: (i) the dedicated secure communication channel over which the request is received, (ii) the identification information for the second client device, or (iii) the indication of the airline application executing on the second client device. In response to determining that the second client device has permission to access the mesh network, the airline application causes the first client device to provide the airline data from the local database to the second client device via the mesh network to synchronize the second client device with the airline data stored at the first client device.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 3A-3C illustrate exemplary user interfaces presented on a client device in the mesh network for indicating the positions of flight crew members on the aircraft;

DETAILED DESCRIPTION

Figure 1:
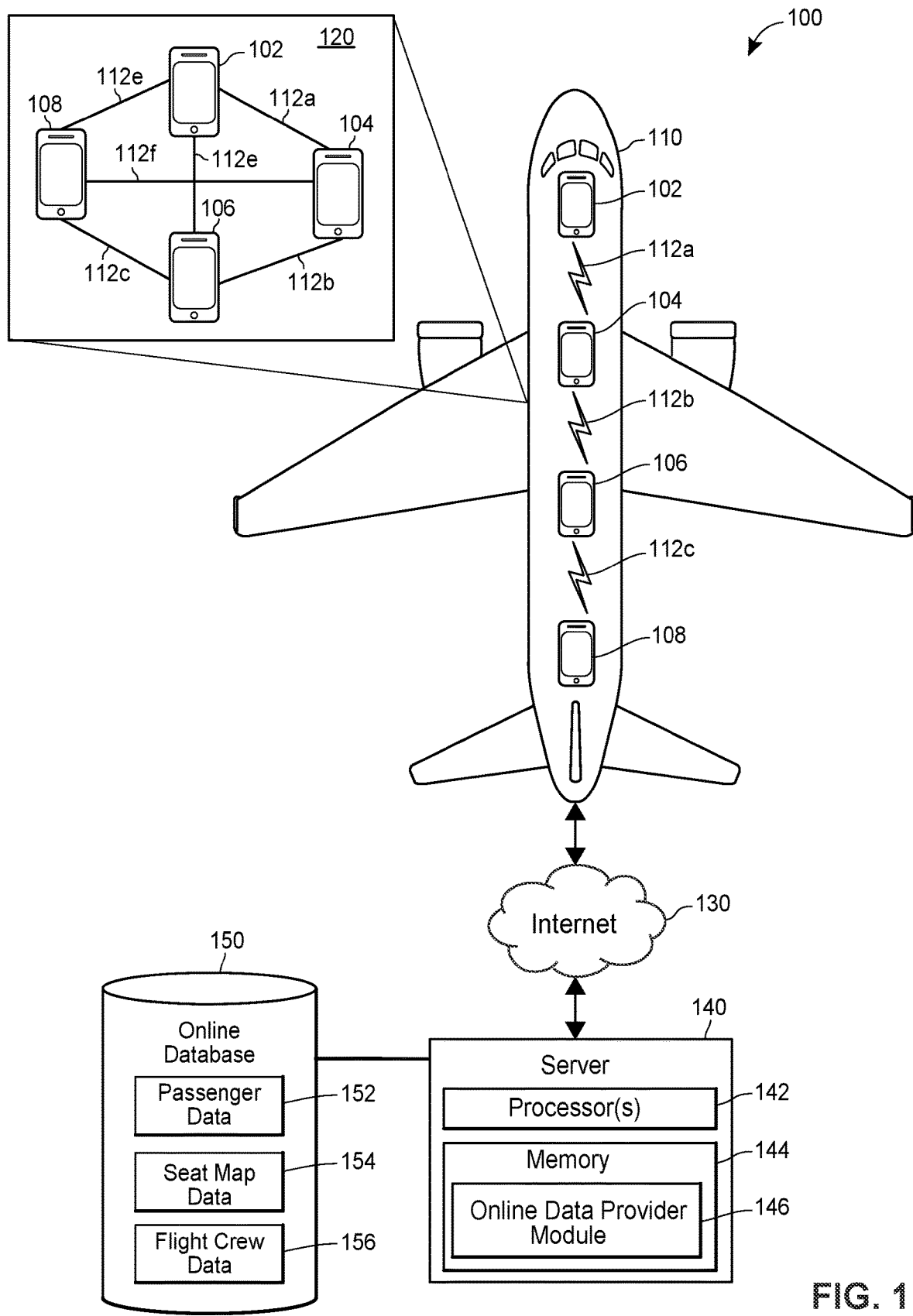
FIG. 1 illustrates a block diagram of a computer network and system on which an airline peer-to-peer data transfer system may operate in accordance with an example aspect of the present disclosure.

Although the following text sets forth a detailed description of numerous different embodiments, it should be understood that the legal scope of the description is defined by the words of the claims set forth at the end of this patent and equivalents. The detailed description is to be construed as providing examples only and does not describe every possible embodiment since describing every possible embodiment would be impractical. Numerous alternative embodiments could be implemented, using either current technology or technology developed after the filing date of this patent, which would still fall within the scope of the claims.

Generally speaking, techniques for transferring airline data peer-to-peer via a mesh network may be implemented in one or more network servers, one or more client devices, or a system that includes a combination of these devices. However, for example purposes, the examples below focus primarily on an embodiment in which a client device executing an airline application on an aircraft obtains initial airline data from an airline server device that provides the initial airline data from an online airline database. The initial airline data may include passenger information, such as the names of the passengers onboard the aircraft and their respective seat locations on the aircraft. The initial airline data may also include meal information such as meal requests made before the flight. Furthermore, the initial airline data may include flight crew information, such as the names of the flight crew members onboard the aircraft. The client device may store the initial airline data locally at the client device in an offline data storage, where the airline application accesses the initial airline data from the offline data storage.

Then when the client device cannot connect to the online airline database via the Internet for example due to the aircraft taking off, the client device communicates with other client devices on the aircraft via a mesh network to obtain updated airline data. For example, the client device may transmit a request to another client device onboard the aircraft via a short-range communication protocol (e.g., Bluetooth®, BLE, Wi-Fi Direct, etc.) to open a communication session with the other client device. The client device may transmit the request over a dedicated secure communication channel and may include identification information for the client device and an indication of the airline application executing on the client device initiating the request. Then the other client device may determine that the client device has permission to access the mesh network based on the dedicated secure communication channel which the client device used to provide the request, the identification information for the client device and/or the airline application initiating the request. If the client device has permission to access the network, the other client device provides updated airline data to the client device via the mesh network. The updated airline data may be encrypted for additional security. Then the client device updates its local copy of the airline data to include the updated airline data.

FIG. 1 illustrates various aspects of an example environment implementing an airline peer-to-peer data transfer system 100. The environment 100 may include a server device 140 and a plurality of client devices 102-108 onboard an aircraft 110 which may be communicatively connected through a network 130, as described below. According to embodiments, the server device 140 may be a combination of hardware and software components, also as described in more detail below. The server device 140 may have an associated online airline database 150 for storing passenger information 152, seat map information 154, and/or flight crew information 156 for flights. The passenger information 152 may include the names of the passengers who reserved seats onboard an aircraft 110 for a particular flight, passenger priority information, the particular seat that each passengers purchased, meal request(s) made by the passenger, etc. The seat map information 154 may include a schematic display of each of the seats on the aircraft 110, the seat numbers assigned to each seat, the travel class for each seat, etc. The flight crew information 156 may include the names of each of the flight crew members onboard an aircraft 110 for a particular flight, the locations of each of the flight crew members within the aircraft 110, etc. Moreover, the server device 140 may include a memory 144, one or more processors 142 such as a microcontroller or a microprocessor, a random-access memory, and/or an input/output (I/O) circuit, all of which may be interconnected via an address/data bus.

The memory 144 and/or the RAM may store various applications for execution by the one or more processors 142. For example, a user interface application may provide a user interface to the server device 140, which user interface may, for example, allow the system administrator to configure, troubleshoot, and/or test various aspects of the server's operation. The server application may be a single module or a plurality of modules.

The memory 144 may be tangible, non-transitory memory and may include any types of suitable memory modules, including random access memory (RAM), read-only memory (ROM), flash memory, other types of persistent memory, etc. The memory 144 may store, for example instructions executable on the processors 142 for an online data provider module 146.

The online data provider module 146 may provide online airline data to client devices 102-108 executing airline applications when the client devices can connect to the network 130. For example, the online data provider module 146 provides initial airline data to the client devices 102-108 onboard the aircraft 110 before the aircraft 110 takes flight. The initial airline data may include a seat map for the aircraft 110, indications of the passengers in each seat on the aircraft 110, meal requests by passengers made before the flight, etc.

The client devices 102-108 may include, by way of example, a tablet computer, a cell phone, a personal digital assistant (PDA), a mobile device smart-phone also referred to herein as a "mobile device," a laptop computer, a portable media player, a wearable computing device, smart glasses, smart watches, phablets, other smart devices, devices configured for wired or wireless RF (Radio Frequency) communication, etc. Of course, any network-enabled device appropriately configured may interact with the airline peer-to-peer data transfer system 100. The client devices 102-108 need not necessarily communicate with the network 130 via a wired connection. In some instances, the client devices 102-108 may communicate with the network 130 via wireless signals and, in some instances, may communicate with the network 130 via an intervening wireless or wired device, which may be a wireless router, a wireless repeater, a base transceiver station of a mobile telephony provider, etc.

In addition to communicating with the network 130, the client devices 102-108 may communicate directly with each via a mesh network 112a-112f. For example, each pair of client devices 102-108 in the mesh network may communicate directly with each other over short-range communication links 112a, 112b, 112c. FIG. 1 illustrates a blown-up view 120 of the client devices 102-108 on the aircraft 110 communicating over the mesh network 112*a*-112*f*. As shown in the blown-up view 120, client device 102 communicates with client device 104 via short-range communication link 112*a*, client device 104 communicates with client device 106 via short-range communication link 112*b*, client device 106 communicates with client device 108 via short-range communication link 112*c*, client device 108 communicates with client device 102 via short-range communication link 112*d*, client device 102 communicates with client device 106 via short-range communication link 112*e*, and client device 104 communicates with client device 108 via short-range communication link 112*f*. In some implementations, when a first client device 102 is outside of a threshold communication range of a second client device 104 in the mesh network 112*a*-112*f*, a third client device 106 within the threshold communication range of the first and second client devices 102, 104 may act as a bridge between the two so that the first client device 102 can receive/transmit communications from/to the second client device 104. For example, the first client device 102 may transmit a communication to the third client device 106 via short-range communication link 112*e*, and the third client device 106 may retransmit the communication to the second client device 104 via short-range communication link 112*b*.

The client devices 102-108 may include a display, a communication unit, a user-input device, a memory, one or more processors such as a microcontroller or a microprocessor, a random-access memory (RAM), and/or an input/output (I/O) circuit, all of which may be interconnected via an address/data bus. The memory may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, a local copy of airline data for a particular flight, and/or other data necessary to interact with the server device 140 through the digital network 130 and to interact with the other client devices 104-108 via the mesh network 112. In some embodiments, the one or more processors may also include, or otherwise be communicatively connected to, other data storage mechanisms (e.g., one or more hard disk drives, optical storage drives, solid state storage devices, etc.) that reside within the client device 102-108.

The communication unit may communicate with the server device 140 via any suitable wireless communication protocol network, such as a wireless telephony network (e.g., GSM, CDMA, LTE, etc.), a Wi-Fi network (802.11 standards), a WiMAX network, a Bluetooth network, etc. The communication unit may also communicate with other client devices 104-108 via any suitable short-range wireless communication protocol network, such as a mesh network 112 where the client devices 102-108 communicate directly with each other via Bluetooth, Wi-Fi Direct, BLE, etc.

The user-input device may include a "soft" keyboard that is displayed on the display of the client device 102-108, an external hardware keyboard communicating via a wired or a wireless connection (e.g., a Bluetooth keyboard), an external mouse, or any other suitable user-input device.

The one or more processors may be adapted and configured to execute any one or more of the plurality of software applications and/or any one or more of the plurality of software routines residing in the memory, in addition to other software applications. One of the plurality of applications may be an airline application that may be implemented as a series of machine-readable instructions for performing the various tasks associated with receiving information at, displaying information on, and/or transmitting information from the client device 102-108. The airline application may be a particular airline application specific to flight crew members and/or other airline personnel that is not accessible by passengers. For example, the client devices 102-108 may be issued to the flight crew members and/or other airline personnel by the airline and may be pre-loaded with the airline application. In some implementations, only client devices 102-108 assigned to the airline may be able to download the airline application.

Another of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information from the server device 140 while also receiving inputs from the user. Yet another application of the plurality of applications may include an embedded web browser that may be implemented as a series of machine-readable instructions for receiving, interpreting, and/or displaying web page information from the server device 140. One of the plurality of routines may include a mesh network request routine which transmits a request to join a mesh network 112 to another client device 104 within a threshold communication range of the client device 102. Another routine in the plurality of routines may include an airline data transmission routine which transmits updated airline data to the other client devices 104-108 in the mesh network 112.

Preferably, a user may launch an airline application from a client device, such as one of the client devices 102-108 to present airline data by communicating with the other client devices 104-108 and/or the server device 140 to implement the airline peer-to-peer data transfer system 100. When the user first launches the airline application, the airline application provides user controls for the user to give the airline application permission to use Bluetooth, BLE, Wi-Fi Direct, or any other suitable short-range communication protocol for communicating with other client devices 104-108 peer-to-peer. Then after the user provides permission, the airline application may automatically utilize the short-range communication protocol upon subsequent uses. Generally, while the term "user" in many instances may be used interchangeably with the terms "flight crew member," and/or other "airline personnel," in this specification, the term "user" is used when referring to a person who is operating a client device and is not exclusive of the terms "flight crew member" and/or other "airline personnel." For example, customers operating client devices may be referred to as users.

Each of the client devices 102-108 may interact with the server device 140 to receive web pages and/or server data and may display the web pages and/or server data via the airline application and/or an Internet browser. For example, the client device 102 may display a web page to a user, may receive an input from the user, may interact with other client devices 104-108, and/or may interact with the server device 140 depending on the type of user-specified input.

It will be appreciated that although only one server device 140 is depicted in FIG. 1, multiple servers 140 may be provided for the purpose of distributing server load, serving different web pages, etc. These multiple servers 140 may include a web server, an entity-specific server (e.g. an Apple® server, etc.), a server that is disposed in a retail or proprietary network, a payment service server, a payment broker server, a payment handler server, etc. Additionally, it will be appreciated that although only four client devices 102-108 are depicted in FIG. 1, any suitable number of client devices 102-108 may be onboard the aircraft 110 and communicate over the mesh network 112 as long as they meet the predetermined criteria for joining the mesh network 112.

The server device 140 may communicate with the client devices 102-108 via the network 130. The digital network 130 may be a proprietary network, a secure public Internet, a virtual private network and/or some other type of network, such as dedicated access lines, plain ordinary telephone lines, satellite links, a wireless telephony network, combinations of these, etc. Where the digital network 130 comprises the Internet, data communication may take place over the digital network 130 via an Internet communication protocol.

The airline application for airline personnel (also referred to herein as the "airline personnel application") executing on a client device 102 may attempt to obtain airline data stored in the online airline database 150 from the server device 140. In some implementations, the airline personnel application obtains static airline data from the server device 140 which does not change throughout a flight, such as a seat map, the names of passengers scheduled to be on the flight, etc. The airline personnel application may also obtain initial dynamic airline data from the server device 140 before the flight takes off, such as seat assignments for the passengers, meal requests provided in advance of the flight, etc. Then during the flight, the airline personnel application obtains dynamic airline data from other client devices 104-108 while the client device is unable to connect to the online airline database 150 via a network 130, such as the Internet.

Figure 2:
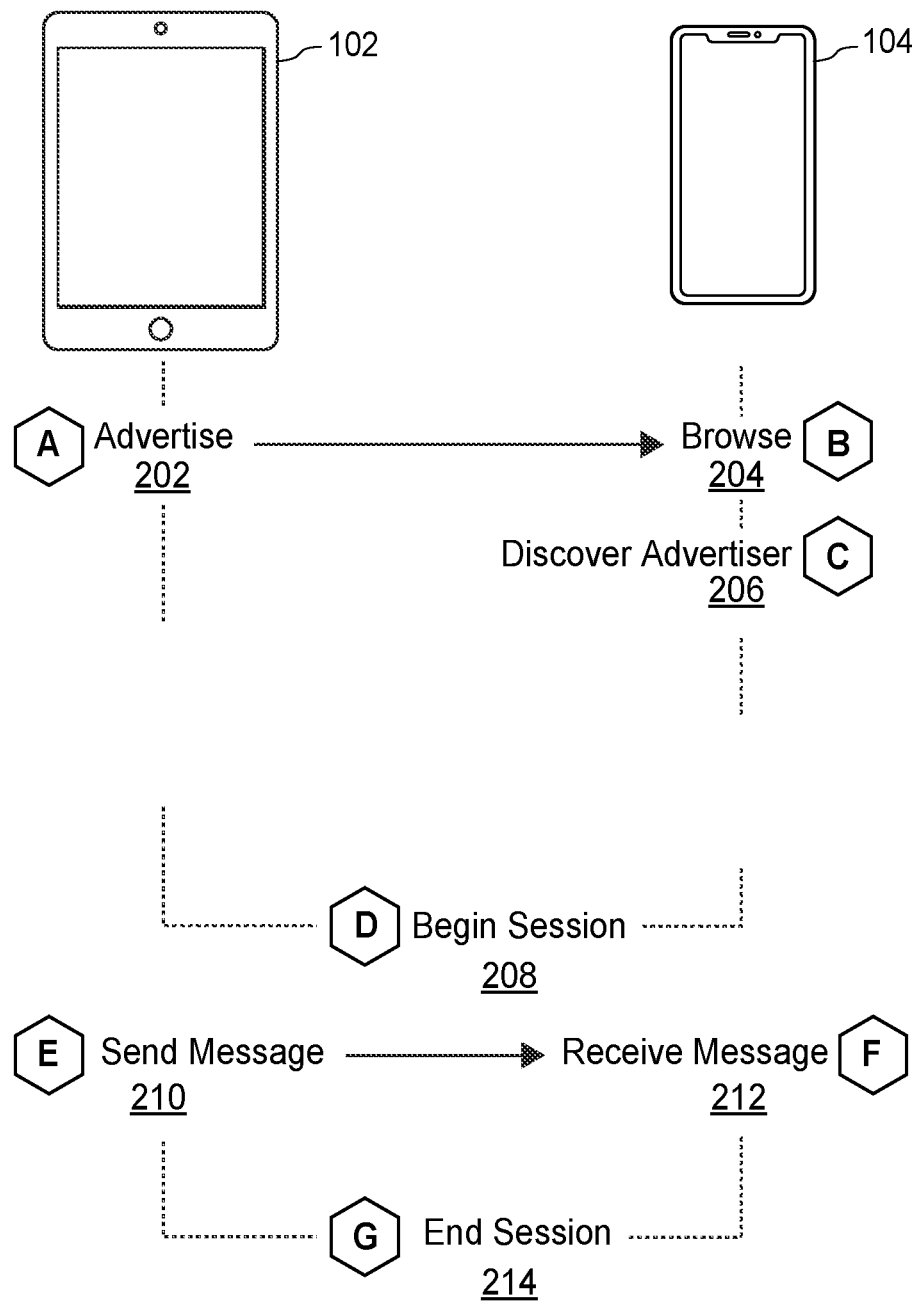
FIG. 2 illustrates an exemplary messaging diagram for a first client device on an aircraft to request to join a mesh network that includes a second client device on the aircraft.

To obtain dynamic airline data from the other client devices 104-108, the airline personnel application communicates a request via a short-range communication protocol to one of the other client devices 104-108 to join a mesh network 112. FIG. 2 depicts a messaging diagram of an example procedure 200 for joining the mesh network 112. The first client device 102 advertises 202 itself to the other client devices 104-108 in the mesh network 112. For example, the first client device 102 broadcasts a communication via a short-range communication protocol (e.g., Bluetooth®, BLE, Wi-Fi Direct) to client devices 104 within a threshold communication range of the first client device 102. The communication may be broadcasted over a particular communication channel and may include identification information (e.g., a (Media Access Control) MAC address, an International Mobile Equipment Identity (IMEI) number, etc.) for the first client device 102, an indication of the airline application executing on the first client device 102, identification information for a user (e.g., an International Mobile Subscriber Identification (IMSI) number) of the first client device 102, etc. The second client device 104, which is part of the mesh network 112, browses 204 for other devices attempting to join the mesh network 112. Then the second client device 104 discovers 206 the first client device 102 for example, by receiving the communication from the first client device 102 over the short-range communication protocol.

The second client device 104, and more specifically, the airline personnel application executing on the second client device 104 may determine whether to admit the first client device 102 to the mesh network 112. For example, the second client device 104 may determine whether to admit the first client device 102 to the mesh network 112 based on a set of predetermined criteria. The set of predetermined criteria may include one or more of: (i) whether the communication is received over a particular dedicated secure communication channel, such as a particular frequency channel and/or time slot or a frequency or time slot range; (ii) whether the first client device 102 is included in a list of predetermined client devices allowed to communicate over the mesh network 112, and/or (iii) whether the communication is sent from the airline personnel application. The set of predetermined criteria may also include whether a user of the first client device 102 is included in a list of authorized users, or may include any other suitable criteria for determining whether to admit the first client device 102 to the mesh network 112.

In response to determining that the first client device 102 meets the set of predetermined criteria, the second client device 104 begins 208 a communication session with the first client device 102. Otherwise, the second client device 104 does not admit the first client device 102 to the mesh network 112.

The first client device 102 transmits 210 a message to the second client device 104 which is received 212 at the second client device 104. The first client device 102 may broadcast the message to each of the client devices 104-108 in the mesh network 112. In other implementations, the first client device 102 transmits the message to the second client device 104 which rebroadcasts/retransmits the message to the other client devices 104-108 in the mesh network 112. In yet other implementations, the first client device 102 broadcasts the message to client devices 104-108 in the mesh network within the threshold communication range of the first client device 102, and the client devices 104-108 may rebroadcast/retransmit the message to other client devices in the mesh network within the threshold communication range of the client devices 104-108.

In some implementations, the first client device 102 encrypts the message and transmits 210 the encrypted message to the second client device 104 or to each of the client devices 104-108 in the mesh network 112. For example, the first client device 102 may encrypt the message via a symmetric key which is shared across the client devices 102-108 in the mesh network 112. The client devices 102-108 in the mesh network 112 may then decrypt the message using the symmetric key. In other implementations, the message may be encrypted/decrypted using a public key/private key pair. For example, the second client device 104 may share its public key with the first client device 102. The first client device 102 may then encrypt the message using the second client device's 104 public key. Then when the second client device 104 receives the encrypted message, the second client device 104 decrypts the message using the second client device's 104 private key.

Furthermore, the first client device 102 may transmit the message in one or several data formats, such as an iOS Core Data Object, JSON format, a dictionary structure, XML format, etc. In this manner, the data may be compatible with a wide range of applications.

The message may include updated airline data, such as an update to a seat assignment for a passenger when the passenger changes seats on the aircraft 110, an updated meal inventory after a flight crew member identifies the meals in the galley, etc. In some implementations, the size of the message may not exceed a threshold size (e.g., 100 kB). In this manner, the message does not exceed bandwidth requirements of the short-range communication protocol and the client devices 102-108 in the mesh network can each store the updated airline data in an offline database that has a limited amount of storage.

In some implementations, a client device 102 in the mesh network 112 needs to have the airline personnel application running to receive airline data from the other client devices 104-108. Also in some implementations, after the client device 102 launches the airline personnel application, the client device 102 may run the airline personnel application in the background mode and still receive airline data from the other client devices 104-108 while executing other applications and/or saving battery power by running the airline personnel application in the background mode.

Then the communication session ends 214, for example when the first client device 102 is outside of the threshold communication range of the other devices 104-108 in the mesh network 112, the aircraft 110 arrives at the destination, etc.

In some implementations, the first client device 102 may disconnect from the mesh network 112 for example by being outside of the threshold communication range of the other devices 104-108 in the mesh network. When the first client device 102 reconnects to the mesh network 112 (e.g., by entering the threshold communication range of one of the other devices 104-108 in the mesh network), the first client device 102 automatically receives airline data via the mesh network 112 that changed while the first client device 102 was disconnected from the mesh network 112. In this manner, the first client device 102 automatically obtains changes to the airline data while the first client device was disconnected from the mesh network.

FIGS. 3A-6C illustrate example user interfaces which may be presented via the airline personnel application on the client device 102. While these are a few example user interfaces, these are for ease of illustration only. Additional or alternative user interfaces may also be presented via the airline personnel application. Furthermore, while the example user interfaces present airline data that includes flight crew position data, seat map data, passenger seat assignment data, meal inventory data, meal request data, meal assignment data, and meal drop off data, other types of airline data may be communicated over the mesh network 112. For example, maintenance data, mechanical data, and/or other data related to aircraft operations may be communicated between airline personnel client devices 102-108. Furthermore, overhead bin data may also be communicated, such as indications of overhead bins that are full and the overhead bins that still have room to store more luggage.

In any event, FIGS. 3A-3C illustrate example user interfaces 300-360 for indicating the positions of flight crew members on the aircraft. As shown in FIG. 3A, an example user interface 300 includes an indication of a position of the user within the aircraft 302 and a user control 304 for changing the position of the user within the aircraft. In response to receiving a selection of the user control 304, the airline personnel application may include additional user controls for obtaining the new position of the user, such as a drop-down menu or a free-form text field. Then when the new position is entered, the airline personnel application may store the new position in the offline data storage of the client device 102 and transmit updated airline data that includes the new position of the user to the other client devices 104-108 in the mesh network 112. For example, the client device 102 may update a local copy of the flight crew position data in the offline data storage to include an indication of the new position of the flight crew member.

The user interface 300 also includes a user control 306 for synchronizing the airline data with the other client devices 104-108 in the mesh network 112. In response to receiving a selection of the user control 306, the client device 102 may transmit updated airline data to the other client devices 104-108 in the mesh network 112 and/or may receive updated airline data from the other client devices 104-108 in the mesh network 112. Still further, the user interface 300 includes an indication 308 of the other flight crew members and/or airline personnel connected to the client device 102 via the mesh network 112. For example, the user interface 300 indicates that the client device 104 for Prasanta Dhala is connected to the client device 102 via the mesh network 112.

FIGS. 3B and 3C illustrates example user interfaces 330, 360 which are similar to the user interface 300. The example user interfaces 330, 360 indicate additional client devices 106, 108 that have connected to the client device 102 via the mesh network. For example, the user interface 330 indicates that in addition to the client device 104 for Prasanta Dhala, the client device 106 for Vijay Khattar has connected to the client device 102 via the mesh network 112. The user interface 360 further indicates that in addition to the client devices 104, 106 for Prasanta Dhala, and Vijay Khattar, respectively, the client device 108 for Harikrishnan Bakthavachalu has connected to the client device 102 via the mesh network 112.

Figures 4A, 4B:
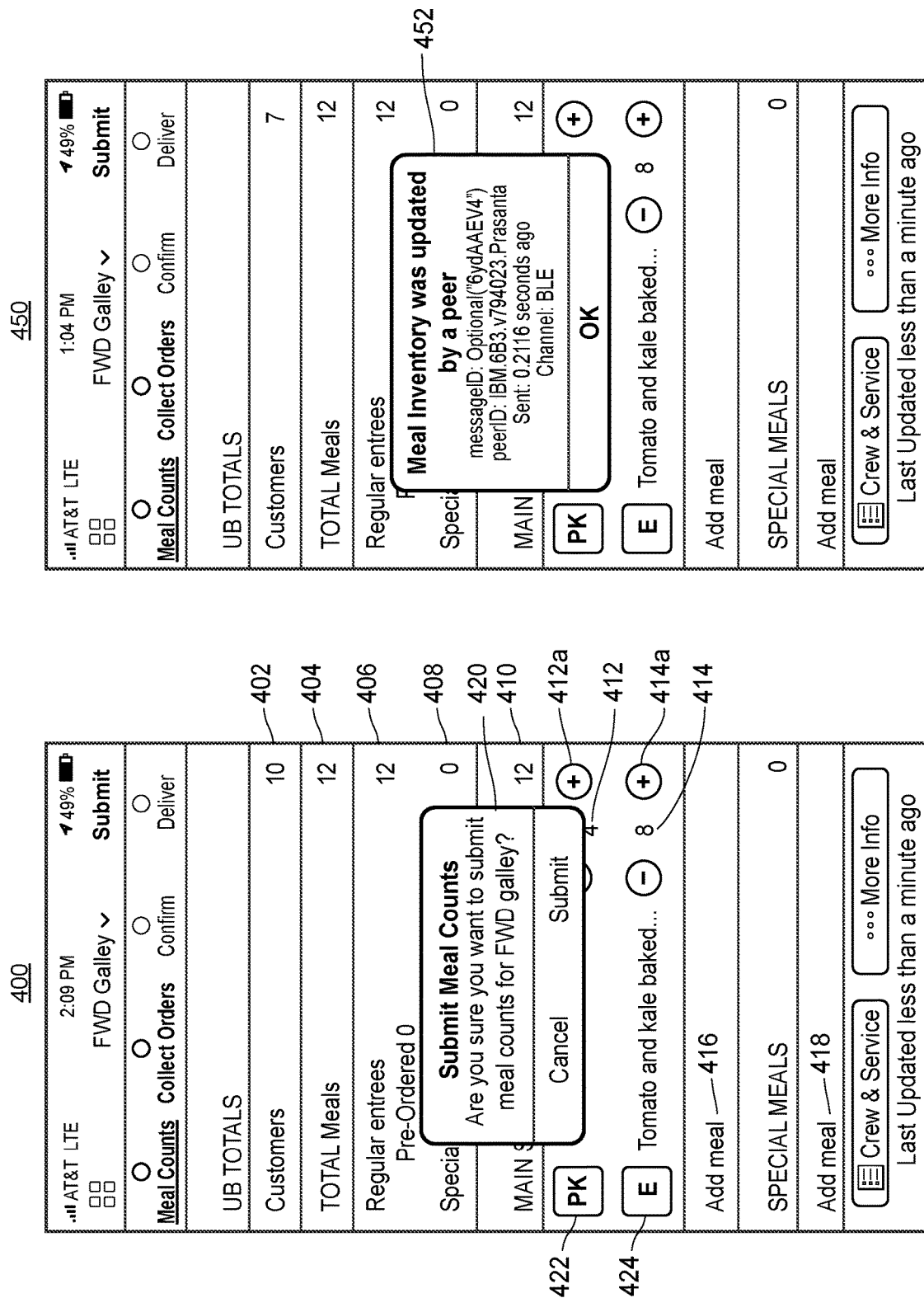
FIGS. 4A-4B illustrate exemplary user interfaces presented on a client device in the mesh network for providing a meal inventory onboard the aircraft.

FIGS. 4A-4B illustrate example user interfaces 400-450 for providing a meal inventory onboard the aircraft. The user interface 400 may be presented on a first client device 102 in the mesh network, and the user interface 450 may be presented on a second client device 104 in the mesh network that receives an updated meal inventory from the first client device 102. The user interface 400 may include indications of the number of passengers on the flight 402, the total number of available meals 404, the number of regular entrees requested 406, the number of special entrees requested 408, the types of meals for the regular entrees 422, 424, and the number of each type of meal available 412, 414.

The user interface 400 also includes user controls for adding a type of regular meal 416, adjusting the number of each type of meal 412a, 414a, and adding a type of special meal 418. When a user enters the meal inventory information, the user may select a user control 420 to update the meal inventory, and transmit the updated meal inventory to the other client devices 104-108 in the mesh network 112. For example, the client device 102 may update a local copy of the meal data in the offline data storage to include the meal inventory. Accordingly, the client device 104 receives the updated meal inventory and presents the updated meal inventory via the user interface 450, as shown in FIG. 4B. The user interface 450 also includes a notification 452 that the meal inventory was updated by a peer, over a BLE communication channel.

Figure 5B:
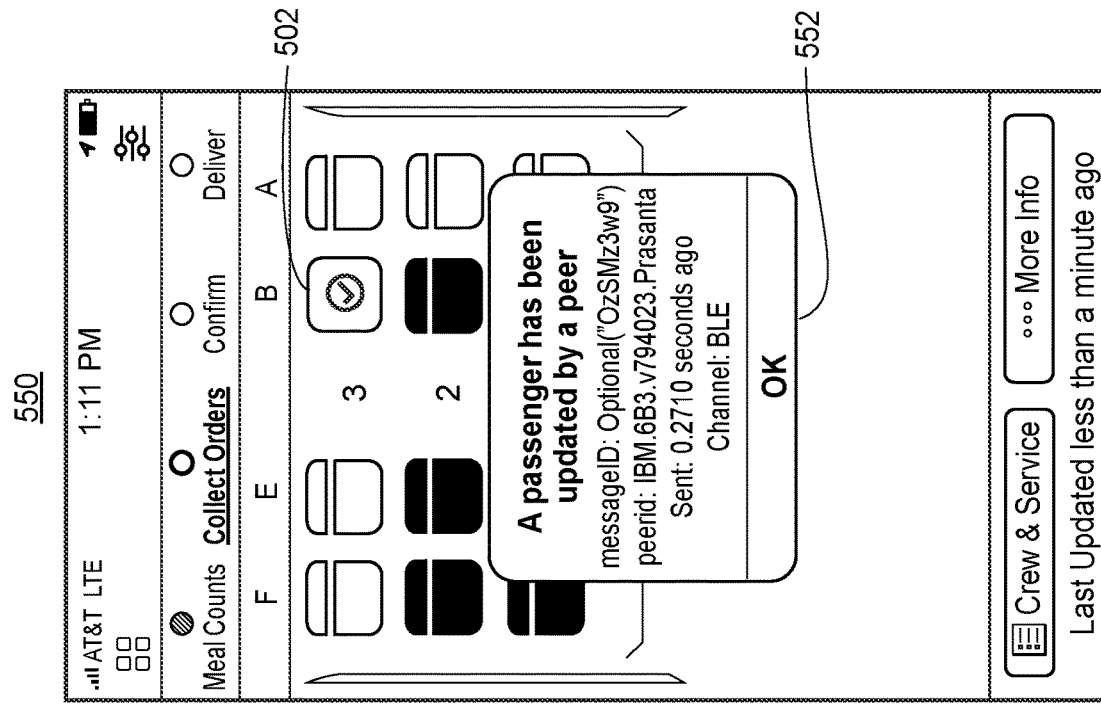
FIGS. 5A-5B illustrate exemplary user interfaces presented on a client device in the mesh network for entering meal orders at particular seats on the aircraft.
Figure 5A:
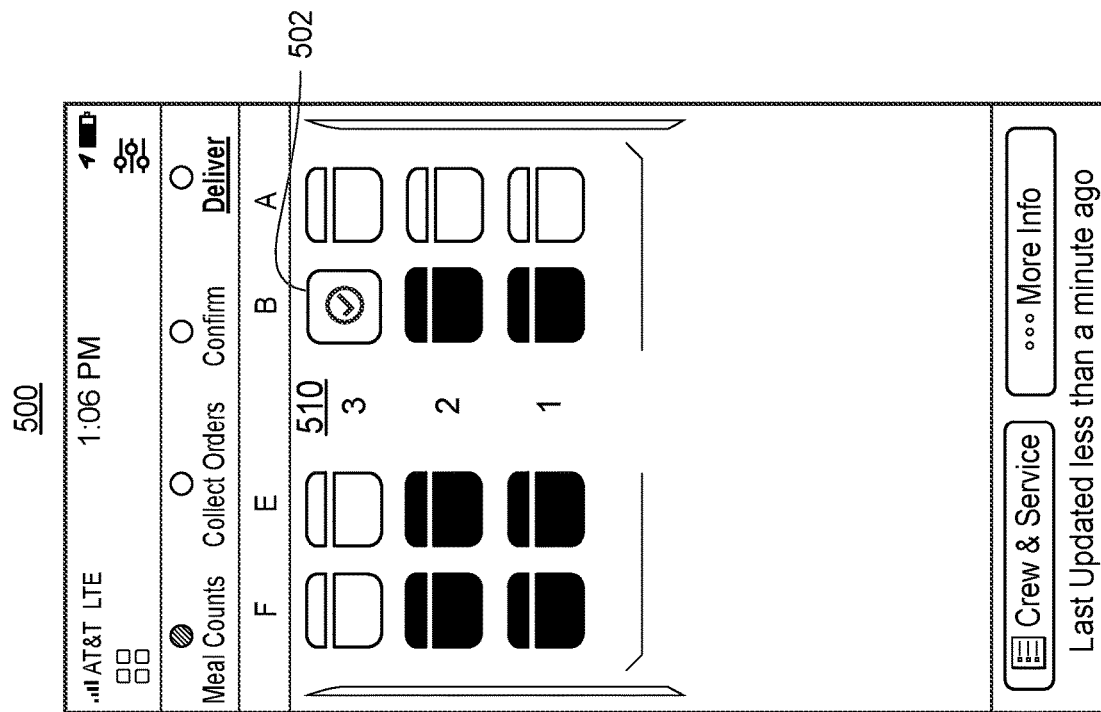

FIGS. 5A-5B illustrate example user interfaces 500-550 for entering meal orders at particular seats on the aircraft. The user interface 500 may be presented on a first client device 102 in the mesh network, and the user interface 550 may be presented on a second client device 104 in the mesh network that receives an updated meal request from the first client device 102. The user interface 500 includes a seat map 510 indicating the locations of seats on the aircraft, such as seat 3B (ref. no. 502). A meal request may be obtained for each seat or at least the seats where corresponding passengers would like a meal. For example, the airline personnel application may obtain pre-ordered meal requests from the online airline database 150. A pre-ordered meal request may include multiple meal types preferred by the passenger provided in a ranked choice order. For example, the passenger may indicate that their first choice is chicken, their second choice is pasta, and their third choice is fish.

When a passenger does not provide a pre-ordered meal request at a particular seat, the user may ask the passenger at the particular seat for their meal request and then enter the meal request via a user control on the user interface 500. For example, when the passenger is in seat 3B, the user may select the icon representing seat 3B (ref. no. 502) on the seat map 510, and the user interface 500 may present user controls (e.g., a drop-down menu, a free-form text field, etc.) for the user to enter the passenger's meal request. As with the pre-ordered meal request, the meal request may include multiple meal types preferred by the passenger provided in a ranked choice order. The user may enter the multiple meal types in the ranked order via user controls on the user interface 500. Then when the user enters the meal request for the passenger at a particular seat, the user may select a user control to update the meal request, and transmit the updated meal request to the other client devices 104-108 in the mesh network 112. For example, the client device 102 may update a local copy of the meal data in the offline data storage to include the meal request at the particular seat. Accordingly, the client device 104 receives the updated meal request and presents an indication that the meal request has been updated for the particular seat 502 via the user interface 550, as shown in FIG. 5B. The user interface 450 also includes a notification 552 that the meal request was updated by a peer, over a BLE communication channel.

Then after each of the meal requests have been received and transmitted to the client devices over the mesh network 112, the airline personnel application on each client device 102-108 determines the type of meal to serve each passenger based on the meal inventory, each passenger's meal type preferences, whether the passenger requested a regular or special meal, and/or other passenger or seat characteristics, such as priority information for the passenger, the travel class for the passenger, the row for the seat, etc. For example, if five passengers requested the tomato and kale baked egg white pasta as their first choice, the meal inventory indicates there are only four of those meals, and four of the five passengers are in first class while the fifth is in coach, the airline personnel application may determine that the four first class passengers will receive the tomato and kale baked egg white pasta while the fifth passenger will receive another type of meal.

In another implementation, the airline personnel application determines the type of meal to serve each passenger at the time the flight crew members take the meal requests. For example, if the passenger at seat 3B indicates that they want the tomato and kale baked egg white pasta, the airline personnel application determines whether at least one tomato and kale baked egg white pasta is available based on the meal inventory and if it is, the airline personnel application assigns the tomato and kale baked egg white pasta to the passenger in seat 3B and decrements the count of the number of tomato and kale baked egg white pastas in the meal inventory. Otherwise if it is not available, the user asks the passenger at seat 3B for their second choice.

The airline personnel application may also include user controls for confirming the meal requests. This may include confirming that the passenger will accept the type of meal assigned to them even if it was not their first choice.

Figure 6B:
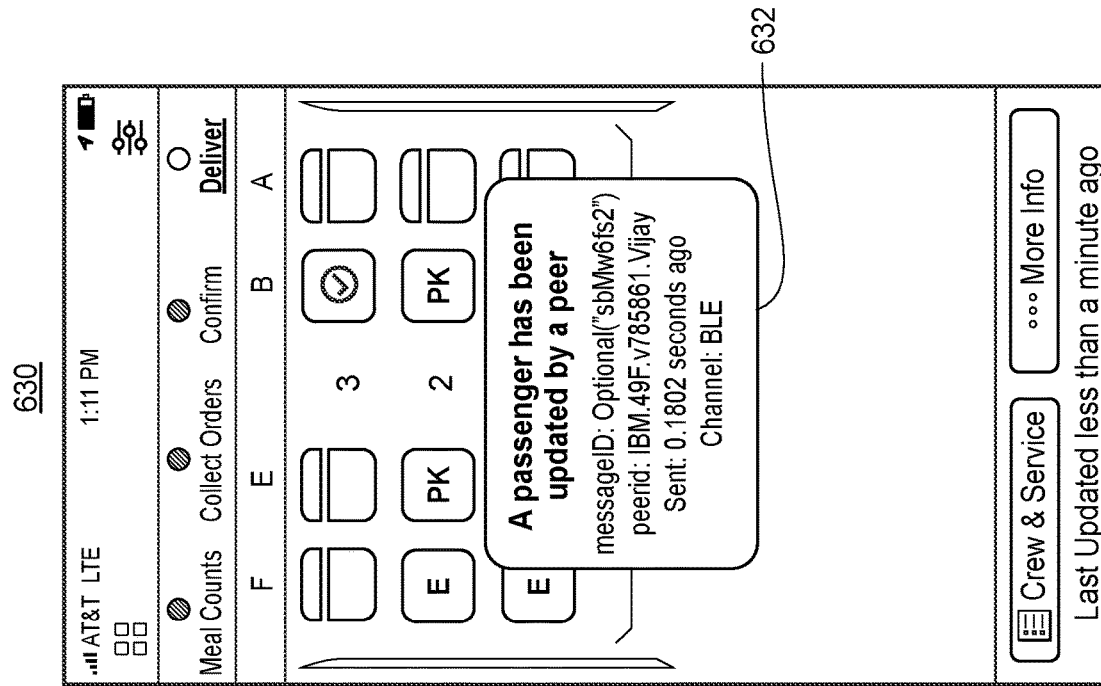
FIGS. 6A-6C illustrate exemplary user interfaces presented on a client device in the mesh network for indicating the types of meals to drop off at each particular seat and for obtaining indications that assigned meal types have been dropped off at respective seats.
Figure 6A:
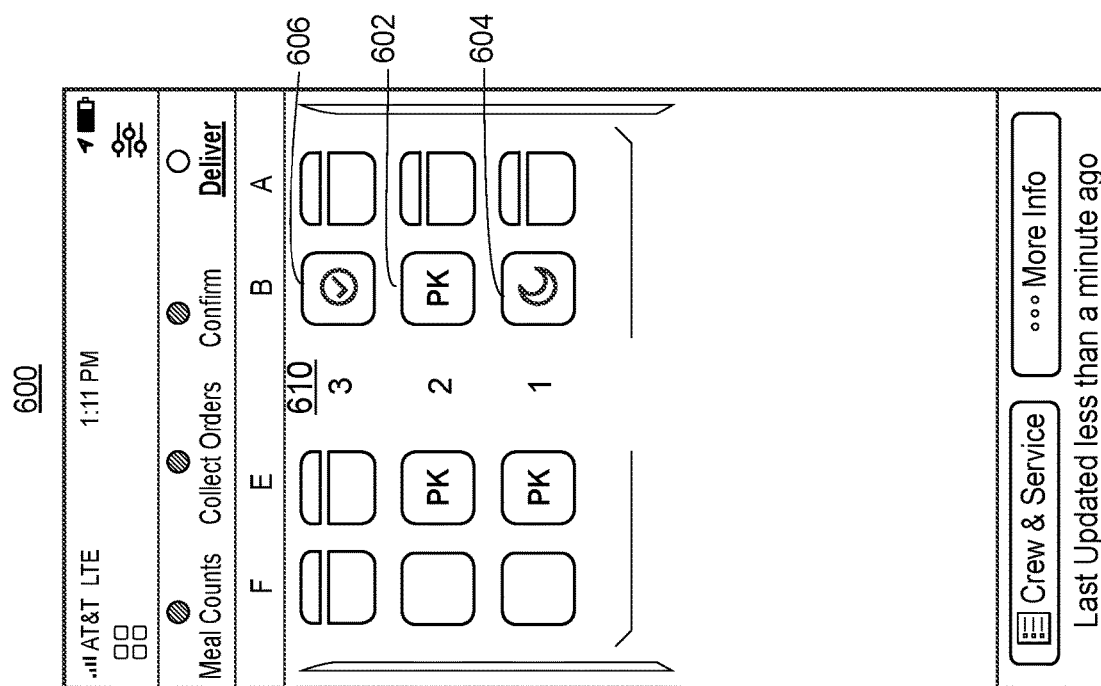
Figure 6C:
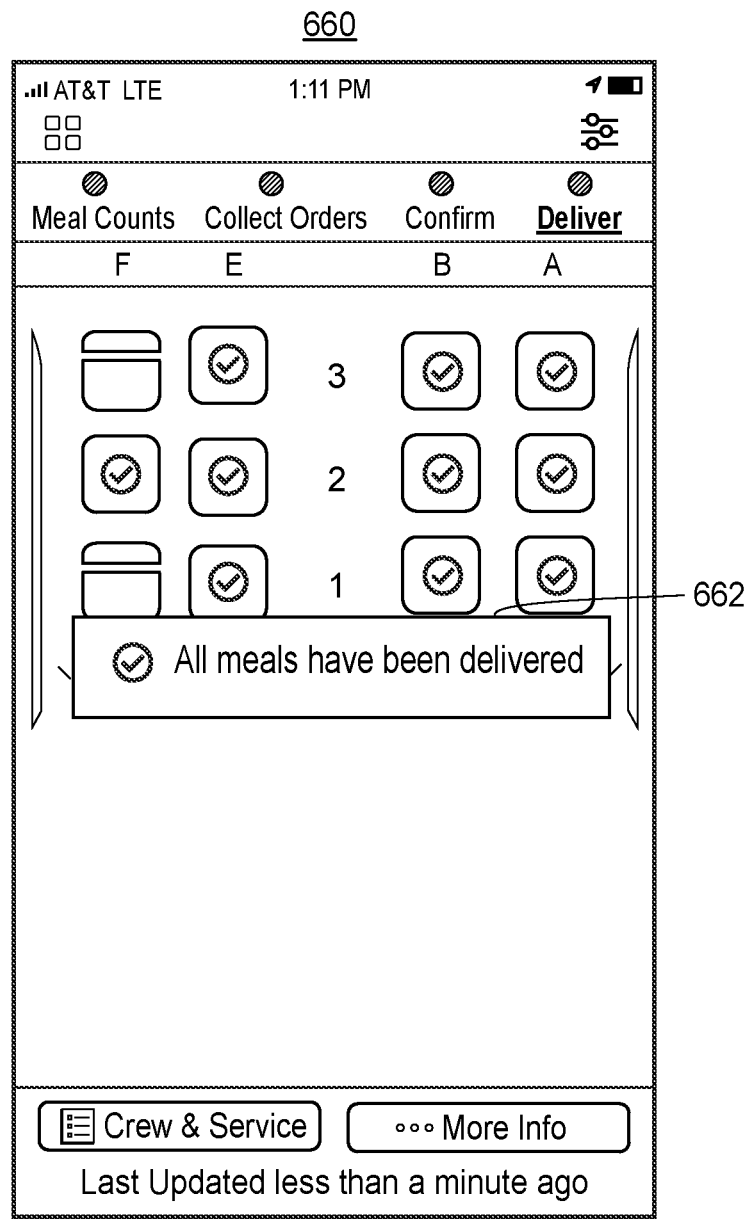

In any event, the airline personnel application presents indications of the meal types that are to be dropped off at particular seats within the seat map. FIGS. 6A-6C illustrate example user interfaces 600-660 for indicating the types of meals to drop off at each particular seat and for obtaining indications that assigned meal types have been dropped off at respective seats. The user interface 600 may be presented on a first client device 102 in the mesh network, and the user interface 630 may be presented on a second client device 104 in the mesh network that receives an update that a meal has been dropped off at a particular seat from the first client device 102. The user interface 600 includes a seat map 610 indicating the locations of seats on the aircraft. At each seat in which a passenger requested a meal, the user interface 600 includes an indication 602 of the meal type assigned to the particular seat. For example, for seat 2B, a particular meal type is assigned which is indicated by the letters "PK." In this manner, the user knows to drop the corresponding meal at seat 2B. The user interface 600 may also include an indication that a passenger in a particular seat is sleeping 604 so that the user knows not to disturb the passenger. Additionally, the user interface 600 may include a user control for indicating that a particular meal type has been dropped off at a particular seat.

For example, the user may touch select the indication of the seat in the seat map 610 to indicate that the particular meal type has been dropped off at the particular seat. In response to receiving a selection of the user control, the user interface 600 may present an indication 606 that the particular meal type has been dropped off at the particular seat. Then the airline personnel application may transmit the update indicating that the particular meal type has been dropped off at the particular seat to the other client devices 104-108 in the mesh network 112. For example, the client device 102 may update a local copy of the meal data in the offline data storage to indicate that the meal having the assigned meal type has been dropped off at the particular seat. Accordingly, the client device 104 receives the update to the meal delivery data and presents an indication 606 that the particular meal type has been dropped off at the particular seat via the user interface 630, as shown in FIG. 6B. The user interface 630 also includes a notification 632 that the meal delivery data has been updated by a peer, over a BLE communication channel.

When meals have been delivered at each seat where a meal is request, the airline personnel application presents a user interface 660, as shown in FIG. 6C. The user interface 660 includes a notification 662 that all of the meals have been delivered.

Figure 7:
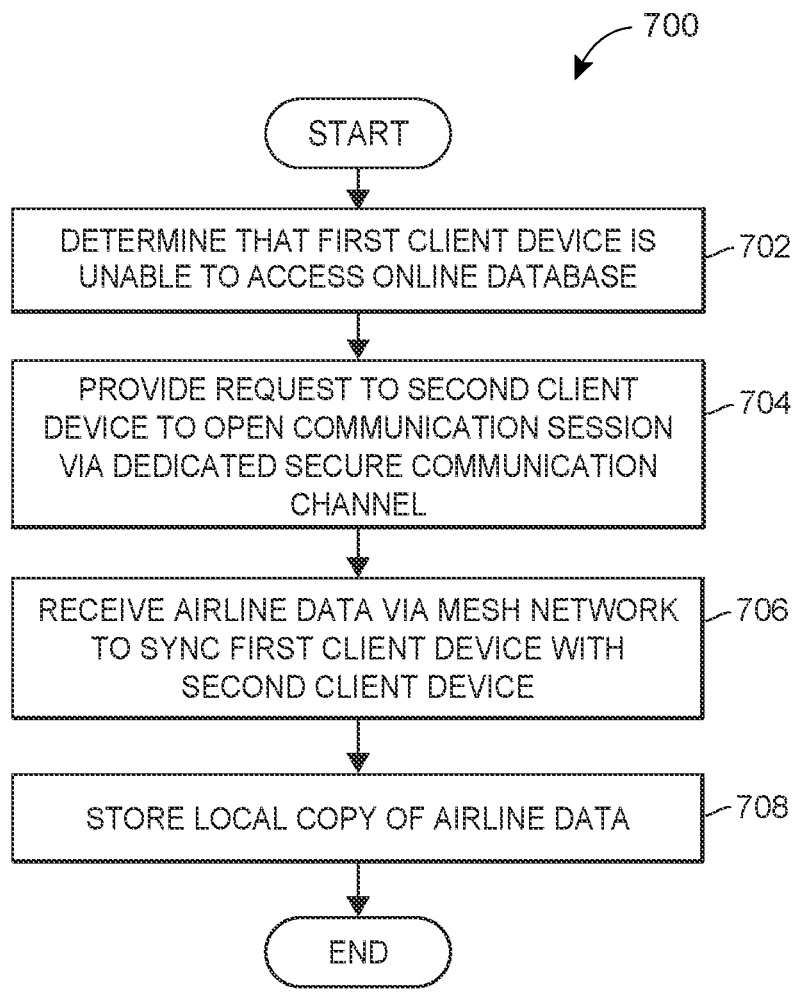
FIG. 7 depicts a flow diagram representing an example method for providing a request to join a mesh network on an aircraft, which may be implemented by a first client device.

FIG. 7 illustrates a flow diagram representing an example method 700 for providing a request to join a mesh network 112 on an aircraft 110. The method may be executed by a first client device 102. For example, at least a portion of the method may be performed by the airline personnel application at the first client device 102. The airline personnel application may include computer-executable instructions stored on one or more non-transitory, tangible, computer-readable storage media or devices, and the computer-executable instructions may be executed to perform the method 700.

At block 702, the first client device 102 determines that it is unable to access an online airline database 150. For example, the first client device 102 may initially obtain online data from the online airline database 150 when the first client device 102 is on the ground. Then when the first client device 102 is in an aircraft 110 that begins traveling to the destination, the first client device 102 may be unable to connect to the Internet.

Then at block 704, the first client device 102 provides a request to a second client device 104 within a threshold communication range of the first client device 102 to open a communication session with the first client device 102. The request may be broadcasted over a dedicated secure communication channel, such as a dedicated secure communication channel designated for communicating airline data with client devices 104-108 in a mesh network 112. Additionally, the request may include identification information (e.g., a MAC address, an IMEI number, etc.) for the first client device 102, an indication of the airline application executing on the first client device 102, identification information for a user (e.g., an IMSI number) of the first client device 102, etc.

The second client device 104, and more specifically, an airline personnel application executing on the second client device, receives the request and determines whether to open the communication session with the first client device 102 and/or admit the first client device 102 to a mesh network 112 of one or more client devices 104-108 communicating peer-to-peer based on the information included in the request and/or the communication channel via which the request was received. For example, the airline personnel application may determine whether to admit the first client device 102 to the mesh network 112 based on a set of predetermined criteria.

The set of predetermined criteria may include one or more of: (i) whether the communication is received over a particular dedicated secure communication channel, such as a particular frequency channel and/or time slot or a frequency or time slot range; (ii) whether the first client device 102 is included in a list of predetermined client devices allowed to communicate over the mesh network 112, and/or (iii) whether the communication is sent from the airline personnel application. The set of predetermined criteria may also include whether a user of the first client device 102 is included in a list of authorized users, or may include any other suitable criteria for determining whether to admit the first client device 102 to the mesh network 112. The second client device 104 may store the list of predetermined client devices allowed to communicate over the mesh network 112 and/or the list of authorized users to compare to the identification information for the first client device 102 and/or the user of the first client device 102 included in the request.

In response to the second client device 104 determining that the first client device 102 has permission to communicate airline data peer-to-peer with the second client device 104 in a mesh network 112, the first client device 102 receives airline data via the mesh network 112 to synchronize the first client device 102 with the airline data stored at the second client device 104 (block 706). For example, the airline data may include an update to a seat assignment for a passenger when the passenger changes seats on the aircraft 110, an updated meal inventory after a flight crew member identifies the meals in the galley, etc.

The first client device 102 may then store a local copy of the airline data in an offline database (block 708). In some implementations, the first client device 102 may update previously stored data with the updates included in the airline data and/or may store new local copies each time airline data is received along with the previous local copies. In other implementations, the first client device 102 may substitute the previous airline data in the offline database with the newly received airline data.

Moreover, the first client device 102 may generate additional airline data and store a local copy of the additional airline data in an offline database or may update the local copy of the airline data to include the additional airline data. Then the first client device 102 may transmit the additional airline data to the second client device 104 and/or other client devices 106, 108 in the mesh network.

Figure 8:
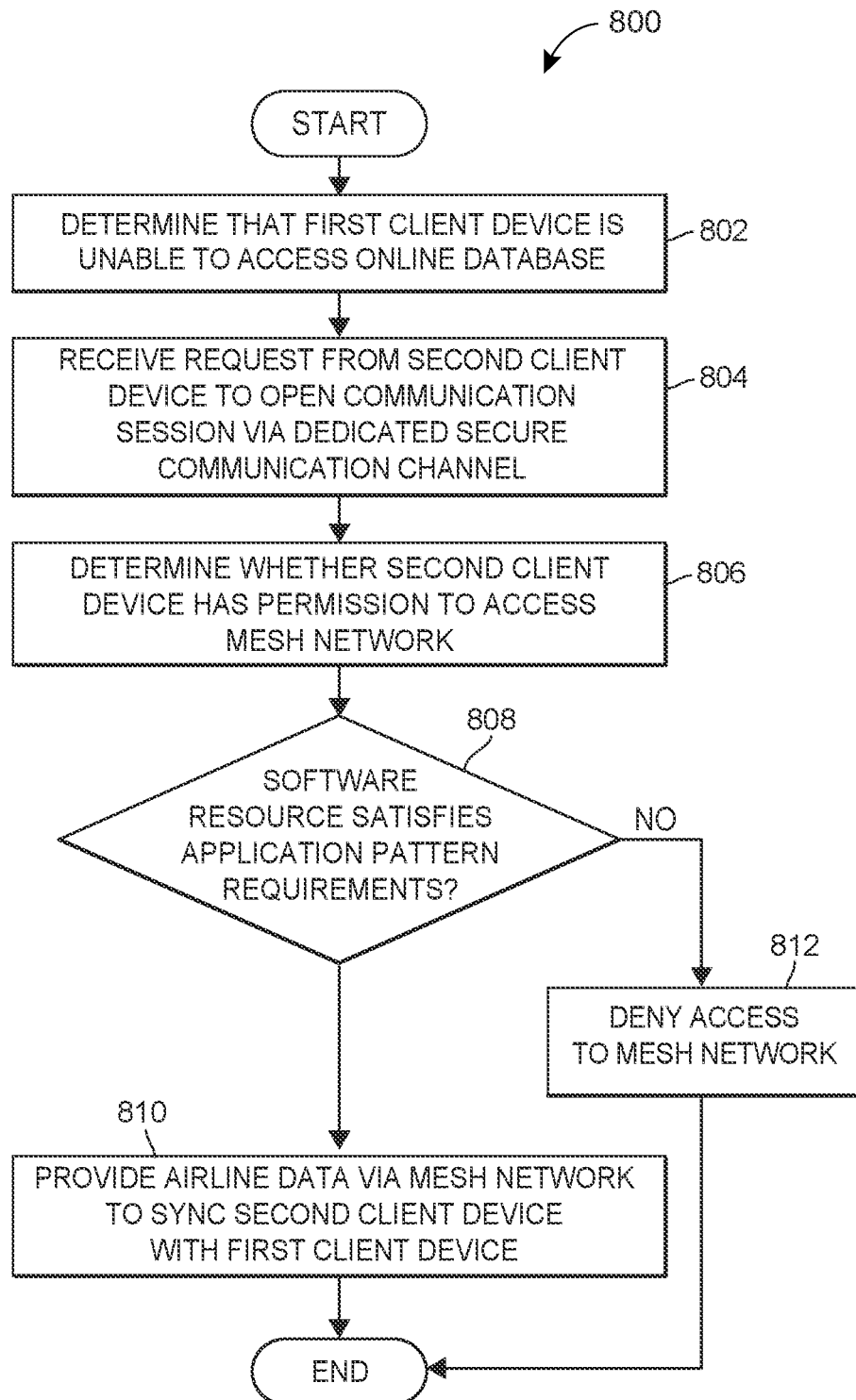
FIG. 8 depicts a flow diagram representing an example method for receiving a request to join a mesh network on an aircraft, which may be implemented by a second client device.

FIG. 8 illustrates a flow diagram representing an example method 800 for receiving a request to join a mesh network 112 on an aircraft 110. The method 800 may be executed by a first client device 102. For example, at least a portion of the method may be performed by the airline personnel application at the first client device 102. The airline personnel application may include computer-executable instructions stored on one or more non-transitory, tangible, computer-readable storage media or devices, and the computer-executable instructions may be executed to perform the method 800.

At block 802, the first client device 102 determines that it is unable to access an online airline database 150. For example, the first client device 102 may initially obtain online data from the online airline database 150 when the first client device 102 is on the ground. Then when the first client device 102 is in an aircraft 110 that begins traveling to the destination, the first client device 102 may be unable to connect to the Internet.

Then at block 804, the first client device 102 receives a request from a second client device 104 within a threshold communication range of the first client device 102 to open a communication session with the first client device 102. The request may be broadcasted over a dedicated secure communication channel, such as a dedicated secure communication channel designated for communicating airline data with client devices 102-108 in a mesh network 112. Additionally, the request may include identification information (e.g., a MAC address, an IMEI number, etc.) for the second client device 104, an indication of the airline application executing on the second client device 104, identification information for a user (e.g., an IMSI number) of the second client device 104, etc. In some scenarios, the request is received at the first client device 102 after the first client device 102 has joined a mesh network 112 with other client devices 106, 108 on the aircraft 110. In other scenarios, the request is received before the first client device 102 communicates with other client devices 106, 108 peer-to-peer.

At block 806, the first client device 102, and more specifically, an airline personnel application executing on the first client device 102, receives the request and determines whether to open the communication session with the second client device 104 and/or admit the second client device 104 to a mesh network 112 of one or more client devices 102, 106, 108 communicating peer-to-peer based on the information included in the request and/or the communication channel via which the request was received. For example, the airline personnel application may determine whether to admit the second client device 104 to the mesh network 112 based on a set of predetermined criteria.

The set of predetermined criteria may include one or more of: (i) whether the communication is received over a particular dedicated secure communication channel, such as a particular frequency channel and/or time slot or a frequency or time slot range; (ii) whether the second client device 104 is included in a list of predetermined client devices allowed to communicate over the mesh network 112, and/or (iii) whether the communication is sent from the airline personnel application. The set of predetermined criteria may also include whether a user of the second client device 104 is included in a list of authorized users, or may include any other suitable criteria for determining whether to admit the second client device 104 to the mesh network 112. The first client device 102 may store the list of predetermined client devices allowed to communicate over the mesh network 112 and/or the list of authorized users to compare to the identification information for the second client device 104 and/or the user of the second client device 104 included in the request.

In response to determining that the second client device 104 has permission to communicate airline data peer-to-peer with the first client device 102 in a mesh network 112 (block 808), the first client device 102 provides airline data via the mesh network 112 to the second client device 104 to synchronize the second client device 104 with the airline data stored at the first client device 102 (block 810). For example, the airline data may include an update to a seat assignment for a passenger when the passenger changes seats on the aircraft 110, an updated meal inventory after a flight crew member identifies the meals in the galley, etc.

Otherwise, if the first client device 102 determines that the second client device 104 does not have permission to access the mesh network 112 (block 808), the first client device 102 denies the second client device from access the mesh network and does not provide airline data to the second client device 104 (block 812).

Moreover, the first client device 102 may generate additional airline data and store a local copy of the additional airline data in an offline database or may update the local copy of the airline data to include the additional airline data. Then the first client device 102 may transmit the additional airline data to the second client device 104 and/or other client devices 106, 108 in the mesh network.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as providing examples only and does not describe every possible embodiment, as describing every possible embodiment would be impractical, if not impossible. One could implement numerous alternate embodiments, using either current technology or technology developed after the filing date of this application.

We claim:

1. A method for providing offline communications on an aircraft, the method comprising:

determining, by one or more processors in a first client device executing an airline application on an aircraft while the aircraft is in flight, that the first client device is unable to access an online airline database;

providing, by the one or more processors via a short-range communication protocol over a dedicated secure communication channel, a request to a second client device to open a communication session with the second client device, the request including identification information for the first client device and an indication of the airline application executing on the first client device;

in response to the second client device determining that the first client device has permission to communicate airline data peer-to-peer with the second client device in a mesh network, receiving, at the one or more processors, airline data via the mesh network to synchronize the first client device with the airline data stored at the second client device; and storing, by the one or more processors, a local copy of the airline data at the first client device.

2. The method of claim 1, further comprising:

generating, by the one or more processors, additional airline data;

updating, by the one or more processors, the local copy of the airline data to include the additional airline data; and transmitting, by the one or more processors, the additional airline data to the second client device via the mesh network.

3. The method of claim 1, wherein a size of the received airline data is less than a threshold data size.

4. The method of claim 1, further comprising:

retransmitting, by the one or more processors, the airline data to another client device in the mesh network within a communication range of the first client device.

5. The method of claim 1, further comprising:

receiving, at the one or more processors, an update to the airline data while the airline application is operating in a background mode; and storing, by the one or more processors, the update in the local copy of the airline data.

6. The method of claim 1, further comprising:

disconnecting, by the one or more processors, from the mesh network; and in response to reconnecting to the mesh network, receiving, at the one or more processors, updated airline data via the mesh network to synchronize the first client device with changes to the airline data while the first client device was disconnected from the mesh network.

7. The method of claim 1, wherein the airline data is passenger meal or seat data and further comprising:

generating, by the one or more processors, a meal inventory indicating a number of total meals or a number of each available meal type;

updating, by the one or more processors, the local copy of the meal data to include the meal inventory; and transmitting, by the one or more processors, the meal inventory to the second client device via the mesh network.

8. The method of claim 7, further comprising:

receiving, at the one or more processors, a meal request for a passenger at a particular seat;

updating, by the one or more processors, the local copy of the meal data to include the meal request at the particular seat; and transmitting, by the one or more processors, the meal request at the particular seat to the second client device via the mesh network.

9. The method of claim 8, further comprising:
displaying, by the one or more processors via a user interface, a seat map indicating the seats on the aircraft and indications of meal types assigned at respective seats on the aircraft;
generating, by the one or more processors, an indication that a meal having an assigned meal type has been dropped off at a respective seat;
updating, by the one or more processors, the local copy of the meal data to indicate that the meal having the assigned meal type has been dropped off at the respective seat; and
transmitting, by the one or more processors, the indication that the meal having the assigned meal type has been dropped off at the respective seat to the second client device via the mesh network.

10. The method of claim 1, wherein the airline data is flight crew position data, and further comprising:
generating, by the one or more processors, an indication of a position of a member of a flight crew within the aircraft;
updating, by the one or more processors, the local copy of the flight crew position data to include the indication of the position of the member of the flight crew; and
transmitting, by the one or more processors, the indication of the position of the member of the flight crew to the second client device via the mesh network.

11. A method for providing offline communications on an aircraft, the method comprising:
determining, by one or more processors in a first client device executing an airline application on an aircraft while the aircraft is in flight, that the first client device is unable to access an online airline database;
receiving, by the one or more processors via a short-range communication protocol over a dedicated secure communication channel, a request from a second client device to open a communication session with the first client device, the request including identification information for the second client device and an indication of the airline application executing on the second client device;
determining, by the one or more processors, whether the second client device has permission to access a mesh network for communicating airline data peer-to-peer based on one or more of: (i) the dedicated secure communication channel over which the request is received, (ii) the identification information for the second client device, or (iii) the indication of the airline application executing on the second client device;
in response to determining that the second client device has permission to access the mesh network, providing, by the one or more processors, airline data to the second client device via the mesh network to synchronize the second client device with the airline data stored at the first client device.

12. The method of claim 11, further comprising:
generating, by the one or more processors, additional airline data;
updating, by the one or more processors, a local copy of the airline data to include the additional airline data; and
transmitting, by the one or more processors, the additional airline data to the second client device via the mesh network.

13. The method of claim 11, wherein a size of the airline data is less than a threshold data size.

14. The method of claim 11, further comprising:
receiving, at the one or more processors, an update to the airline data while the airline application is operating in a background mode; and
storing, by the one or more processors, the update in a local copy of the airline data.

15. The method of claim 11, further comprising:
disconnecting, by the one or more processors, from the mesh network; and
in response to reconnecting to the mesh network, receiving, at the one or more processors, updated airline data via the mesh network to synchronize the first client device with changes to the airline data while the first client device was disconnected from the mesh network.

16. A first client device for providing offline communications on an aircraft, the first client device comprising:
a local database storing airline data;
one or more processors; and
a non-transitory computer readable memory coupled to the one or more processors and the database, including an airline application stored thereon that, when executed by the one or more processors, cause the first client device to:
determine on an aircraft while the aircraft is in flight that the first client device is unable to access an online airline database;
receive, via a short-range communication protocol over a dedicated secure communication channel, a request from a second client device to open a communication session with the first client device, the request including identification information for the second client device and an indication of the airline application executing on the second client device;
determine whether the second client device has permission to access a mesh network for communicating the airline data peer-to-peer based on one or more of: (i) the dedicated secure communication channel over which the request is received, (ii) the identification information for the second client device, or (iii) the indication of the airline application executing on the second client device;
in response to determining that the second client device has permission to access the mesh network, provide the airline data from the local database to the second client device via the mesh network to synchronize the second client device with the airline data stored at the first client device.

17. The first client device of claim 16, wherein the airline application further causes the first client device to:
generate additional airline data;
update the local database to include the additional airline data; and
transmit the additional airline data to the second client device via the mesh network.

18. The first client device of claim 16, wherein a size of the airline data is less than a threshold data size.

19. The first client device of claim 16, wherein the airline application further causes the first client device to:
receive, via the mesh network, an update to the airline data while the airline application is operating in a background mode; and
store the update in the local database.

20. The first client device of claim 16, wherein the airline application further causes the first client device to:
disconnect from the mesh network; and
in response to reconnecting to the mesh network, receive updated airline data via the mesh network to synchronize the first client device with changes to the airline data while the first client device was disconnected from the mesh network.

* * * * *